(12) United States Patent
Ratcliff et al.

(10) Patent No.: US 8,450,874 B2
(45) Date of Patent: May 28, 2013

(54) USER MANAGED POWER SYSTEM WITH SECURITY

(75) Inventors: Gregory W. Ratcliff, Ashley, OH (US); Philip R. Aldag, Columbus, OH (US)

(73) Assignee: Liebert Corporation, Columbus, OH (US)

( * ) Notice: Subject to any disclaimer, the term of this patent is extended or adjusted under 35 U.S.C. 154(b) by 1022 days.

(21) Appl. No.: 11/952,756

(22) Filed: Dec. 7, 2007

(65) Prior Publication Data

US 2008/0136607 A1    Jun. 12, 2008

Related U.S. Application Data

(60) Provisional application No. 60/869,215, filed on Dec. 8, 2006.

(51) Int. Cl.
| H02J 3/14 | (2006.01) |
| H02J 3/00 | (2006.01) |
| H02B 5/00 | (2006.01) |
| H02B 1/26 | (2006.01) |
| G06F 1/00 | (2006.01) |
| G06F 15/173 | (2006.01) |
| H01R 25/00 | (2006.01) |

(52) U.S. Cl.
USPC ............ 307/34; 307/38; 307/155; 361/601; 361/622; 713/310; 713/340; 439/652; 709/223

(58) Field of Classification Search
USPC ................................................. 340/310.11
See application file for complete search history.

(56) References Cited

U.S. PATENT DOCUMENTS

| 5,281,859 A | 1/1994 | Crane |
| 5,424,903 A | 6/1995 | Schreiber |
| 5,862,393 A | 1/1999 | Davis |
| 6,410,994 B1 | 6/2002 | Jones et al. |
| 6,445,087 B1 | 9/2002 | Wang et al. |

(Continued)

FOREIGN PATENT DOCUMENTS

| EP | 1081921 A2 | 3/2001 |
| WO | 9310615 | 5/1993 |
| WO | 0069081 | 11/2000 |

OTHER PUBLICATIONS

International Search Report for International Patent Application No. PCT/US2007/086809.

(Continued)

*Primary Examiner* — Jennifer Mehmood
*Assistant Examiner* — John Mortell
(74) *Attorney, Agent, or Firm* — Locke Lord LLP

(57) ABSTRACT

The present invention is related to user managed power systems with security. The invention encompasses a method and system of managing a power system wherein a data center user determines whether there is a desire to control remote power supply socket assigned to the user's data module. The data center user is able to sign into the remote power supply through a security protocol. Then the data center user can gain control over the remote power supply socket assigned to the user's data module. Finally, this allows the data center user to remotely control the power supply socket assigned to the user's data module.

20 Claims, 5 Drawing Sheets

U.S. PATENT DOCUMENTS

| | | | |
|---|---|---|---|
| 6,608,406 | B2 | 8/2003 | Bersiek |
| 6,618,772 | B1 | 9/2003 | Kao et al. |
| 6,711,613 | B1 | 3/2004 | Ewing et al. |
| 6,741,442 | B1 | 5/2004 | McNally et al. |
| 6,744,150 | B2 | 6/2004 | Rendic |
| 6,826,036 | B2 | 11/2004 | Pereira |
| 6,937,461 | B1 | 8/2005 | Donahue |
| 7,010,589 | B2 | 3/2006 | Ewing et al. |
| 7,043,543 | B2 | 5/2006 | Ewing et al. |
| 7,099,934 | B1 | 8/2006 | Ewing et al. |
| 7,141,891 | B2 | 11/2006 | McNally et al. |
| 7,162,521 | B2 | 1/2007 | Ewing et al. |
| 7,171,461 | B2 * | 1/2007 | Ewing et al. ................. 709/223 |
| 7,196,900 | B2 | 3/2007 | Ewing et al. |
| 7,268,998 | B2 | 9/2007 | Ewing et al. |
| 7,280,931 | B1 * | 10/2007 | Kim et al. ...................... 702/81 |
| 2003/0122683 | A1 | 7/2003 | Downer |
| 2004/0165358 | A1 | 8/2004 | Regimbal et al. |
| 2004/0178270 | A1 | 9/2004 | Pradhan et al. |
| 2005/0018372 | A1 * | 1/2005 | Hui ................................ 361/90 |
| 2005/0021252 | A1 * | 1/2005 | Hui ................................ 702/60 |
| 2005/0203987 | A1 | 9/2005 | Ewing et al. |
| 2005/0259383 | A1 | 11/2005 | Ewing et al. |
| 2006/0200681 | A1 * | 9/2006 | Kato et al. .................... 713/193 |
| 2007/0089163 | A1 * | 4/2007 | Denton ............................ 726/2 |

OTHER PUBLICATIONS

Written Opinion for International Patent Application No. PCT/US2007/086809.

Jorg Riegler, International Search Report for International Patent Application No. PCT/US2007/086810, European Patent Office, Germany.

Jorg Riegle R, Written Opinion for International Patent Application No. PCT/US2007/086810, European Patent Office, Germany.

B. Levine and A. Swales. "Wanted: IP addresses for factory network devices! & Software solution for industrial IP addressing tasks." The Industrial Ethernet Book, Jan. 2004, Issue 18.

Ellen Moyse, International Patents Report on Patentability for International Patent Application No. PCT/US2007/086810, dated Jun. 18, 2009, The International Bureau of WIPO, Switzerland.

Ellen Moyse, International Patent Report on Patentability for International Patent Application No. PCT/US2007/086809, dated Jun. 18, 2009, The International Bureau of WIPO, Switzerland.

Anastassiades, G., European Examination Report for European Patent Application No. 07 869 041.9, European Patent Office, Germany, dated Aug. 2, 2011.

* cited by examiner

USER MANAGED POWER SYSTEM WITH SECURITY

CROSS REFERENCE TO RELATED APPLICATIONS

This application claims benefit of and priority to U.S. provisional patent application Ser. No. 60/869,215, filed on Dec. 8, 2006, the entire contents of which are incorporated herein by reference for all purposes.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The invention disclosed and taught herein relates generally to management of remote power systems; and more specifically related to user managed power systems.

2. Description of the Related Art

A data center is a facility used for housing electronic equipment, typically a large number of computers, communications, and peripheral equipment. As the name implies, a data center is usually maintained by an organization for the purpose of handling the data necessary for its operations. A bank, for example, may have a data center, where all of its customers' account information is maintained and transactions involving these accounts are carried out. Practically every company that is mid-sized or larger has some kind of data center and larger companies often have dozens of data centers. Most large cities have many purpose-built data center buildings in secure locations close to telecommunications services.

A data center may occupy one room of a building, one or more floors, or an entire building. Most of the equipment is often in the form of servers organized in rack and/or cabinets, which are usually placed in single rows forming corridors between them. This allows people access to the front and rear of each cabinet. Servers differ greatly in size from 1U servers to huge storage silos that occupy many tiles on the floor. Some equipment such as mainframe computers, blade chassis and storage devices are often as big as the racks themselves, and are placed alongside them.

Communications in data centers today are most often based on networks running the Internet protocol (IP) suite. Data centers typically contain routers and switches that transport data traffic between the servers and the outside world. Redundancy is sometimes provided by sourcing the network connections from multiple vendors. Some of the servers at the data center are used for running the basic Internet and intranet services needed by internal users in the organization; such as email servers, proxy servers, DNS servers, etc. Network security elements are also usually deployed, such as firewalls, VPN gateways, Intrusion detection systems, etc. Also common are monitoring systems for the network and some of the applications. Additional offsite monitoring systems are also typical, in case of a failure of communications inside the data center.

Many IT and networking centers are experiencing higher load densities with more servers and components packed into racks and cabinets. This has created a clear need to monitor and manage the power supplied to each and all of these loads. IT and Facility Managers have the basic need to reliably and efficiently distribute power in the rack or cabinet to their networking equipment. There may be some differences depending on application and requirements these users have with respect to the functionality and connectivity of their devices. In general, these needs are classified by the capabilities of the physical device, its functional behavior, its network infrastructure and its software management models. Furthermore, market needs are addressed by certain expected product requirements.

Each data center is often equipped with controllable and configurable power strips. One such example is the MP Advanced power strip with OpenComms EM PDU. Another prior art example is the MP Advanced power strip with the MP Advanced Access Server. Both products are available from Liebert Corporation.

One of the more troublesome and risky practices in data centers occurs when a server or system locks up and a system administrator requests a power-off reboot. Ideally, the system administrator has individual access to the device and should be able to control the device directly, including power.

Previously all solutions have been hierarchical from the uninterruptible power supply (UPS) to the power distribution unit (PDU) to power strip to socket, and have been managed, installed, and controlled by data center staff. In a typical prior art system, such as a data center, there is an individual in charge of, for example, the email systems. There is also, generally, an individual in charge of all the Web servers. If the Web server administrator wishes to do Web page maintenance of some kind, such as reboot the Web server, the administrator typically calls in to the data center to request a reboot by the data center staff.

The present inventions are directed to improve methods and apparatuses allowing end users to manage power to their servers directly and more efficiently.

BRIEF SUMMARY OF THE INVENTION

A method of managing a power to a remote device is contemplated that comprises determining whether manipulation of a remote power supply assigned to a specific device is permitted; accessing the remote power supply through a security protocol; and manipulating the power supplied to the device.

In addition, a user managed power system is contemplated comprising a powered user device at a first location; an interface at a second location remote from the first location and connected to the first location for data communication between the interface and the device with a security protocol; a power distribution device supplying power to the user device and in data communication with the user device and interface; and wherein the a command entered at the interface causes manipulation of the power supplied to the device.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

In general, Applicants have created a method of managing a power to a remote device that comprises determining whether manipulation of a remote power supply assigned to a specific device is permitted; accessing the remote power supply through a security protocol; and manipulating the power supplied to the device. A user managed power system may comprise a powered user device at a first location; an interface at a second location remote from the first location and connected to the first location for data communication between the interface and the device with a security protocol; a power distribution device supplying power to the user device and in data communication with the user device and interface; and wherein the a command entered at the interface causes manipulation of the power supplied to the device.

Figure 1:
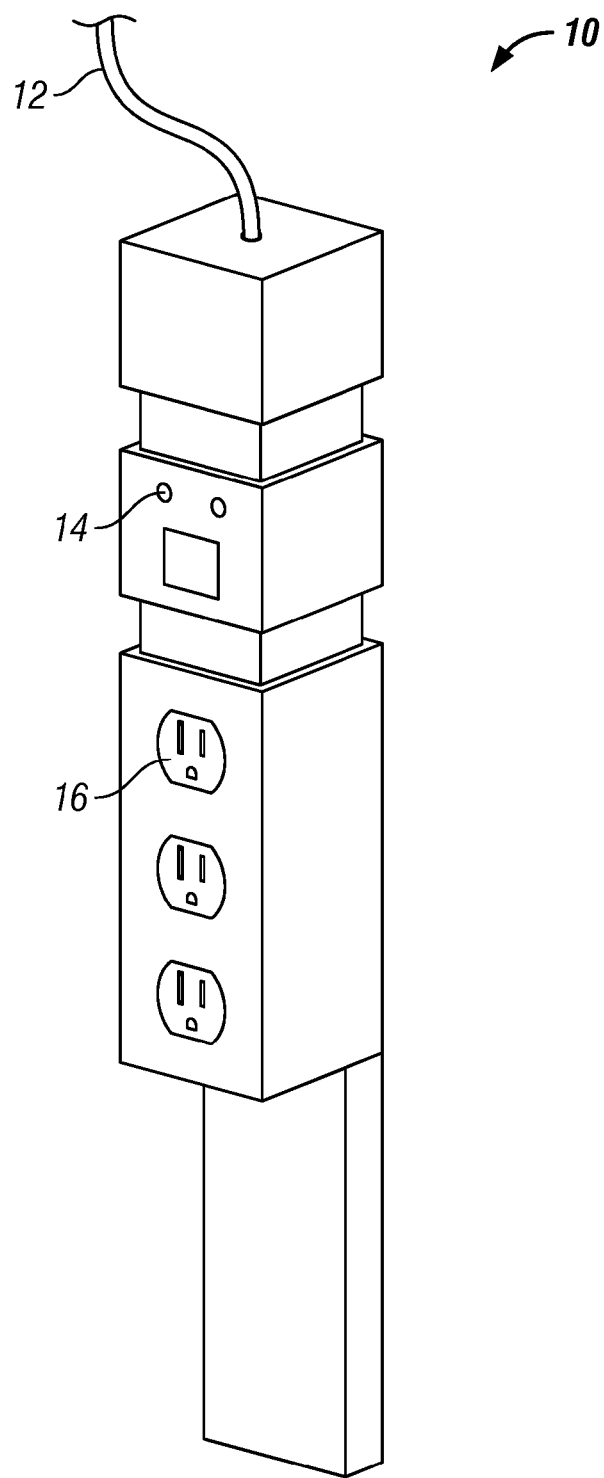
FIG. 1 illustrates one embodiment of an IP configurable power strip for utilization in the present system.

One embodiment of the present invention comprises an IP configurable and manageable power strip 10 as shown in FIG. 1, although any IP configurable power strip is contemplated. Power is supplied to the strip, such as by cord 12. The configurable power strip 10 further comprises at least one communications port 14. The communications port may be adapted to provide support for both IEEE 802.3 compliant 10 Base T, 100 BaseT Ethernet and Gigabit Ethernet networks, or some other communication protocol. The communications port 10 is preferably a dual RJ-45 modular connector. Furthermore, the power strip 10 may be adapted to provide support as a powered device (PD) for Power-Over-Ethernet operation for the 10 Base T, 100 BaseT Ethernet and Gigabit Ethernet, or other communication protocol, port. The power strip is further comprised of at least one power socket 16.

A commercial example of an IP configurable and manageable power strip is the MP Advanced power strips as sold by the Liebert Corporation. Monitoring and controlling of the MP Advanced power strips is accomplished using the OpenComms EM PDU or the Liebert IntelliSlot Asset Manager and IntelliRack, which includes a basic web interface. Another commercial embodiment is an MP Advanced power strip with the MP Advanced Access Server. Both products are available from Liebert Corporation. The Web interface of the MP Advanced Access Server offers summary status of the control module, power strip and each module installed in the access server. The Web interface also permits the user to access information about the individual power strips and controls for each receptacle on any power strip connected to the MP Advanced Access Server.

Figure 2:
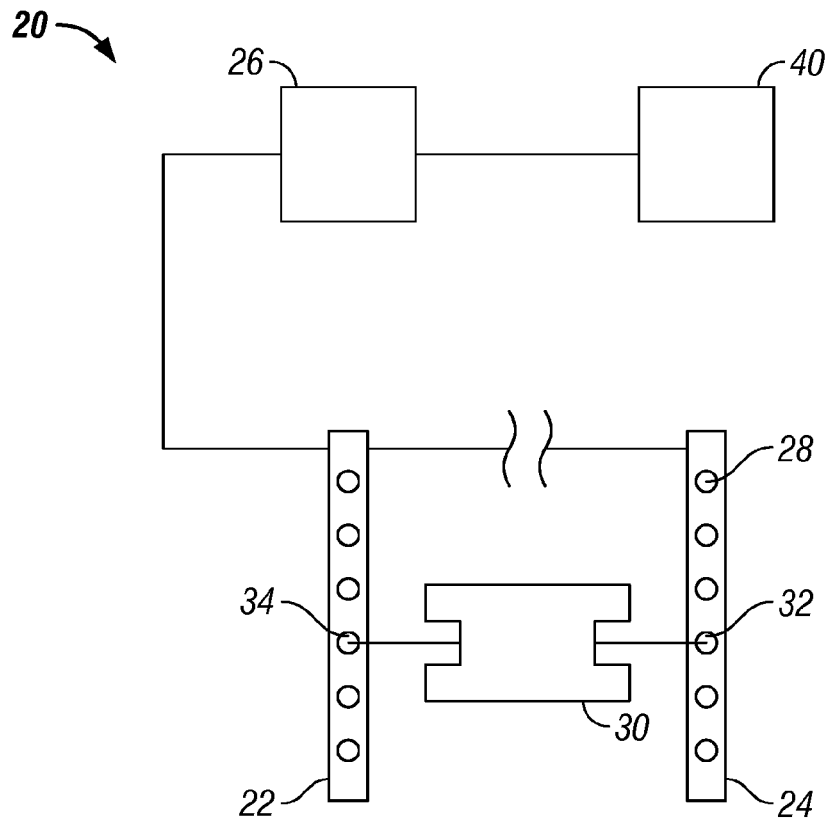
FIG. 2 illustrates a server controlled according to the present invention.

FIG. 2 illustrates a typical setup at a data center. Data center 20 comprises multiple power strips 22 and 24. Each power strip is given an individual IP Address and is connected a communications protocol 26, such as the Internet, a Web, SNMP, or a local network. Each power strip comprises multiple power sockets 28. The data center further comprises a server 30, such as, but not limited to, an e-mail server. The server draws its power from the individual power sockets 32 and 34 of the power strips.

Under certain circumstances, it may become necessary for an administrator of a server, such as an email server, to request that actions be performed with respect to the power supplied to that server. This may include performing a "power-off" reboot of the server. The present invention allows the individual power sockets to be controlled remotely by the server user by the same method and security methodology as the user controls the server. For example, the present invention allows for a power strip design that allows for the complete management of the power strip to be performed using the same security methodology employed by the server being powered. If the owner of a rack space in a data center has control access on, or privilege to, a piece of equipment, then the security software will enable them and grant them direct control of the particular power socket that supplies power to the system by the same method.

For example, and without limitation, if a Storage Area Network (SAN) is controlled and managed via a Radius authentication server, then this invention provides Web-based interface that ties the same SAN authentication to the power strip receptacle that supplies that product. SANs are distinguished from other forms of network storage by the low-level access method that they use. Access methods on SANs are very similar to those used for internal disk drives, like ATA and SCSI. In a storage network, a server issues a request for specific blocks, or data segments, from specific disk drives. This method is known as block storage. The device acts in a similar fashion to an internal drive, accessing the specified block, and sending the response across the network.

RADIUS Authentication is known in the art. Remote Authentication Dial In User Service (RADIUS) is an AAA (authentication, authorization and accounting) protocol for applications such as network access or IP mobility developed by Interlink Networks. It is intended to work in both local and roaming situations. Some ISPs (commonly modem, DSL, or wireless 802.11 services) require you to enter a username and password in order to connect on to the Internet. Before access to the network is granted, this information is passed to a Network Access Server (NAS) device over a protocol, then to a RADIUS server over the RADIUS protocol. The RADIUS server checks that the information is correct using authentication schemes like PAP, CHAP or EAP. If accepted, the server will then authorize access to the ISP system and select an IP address, L2TP parameters, etc. The RADIUS server will also be notified if and when the session starts and stops, so that the user can be billed accordingly; or the data can be used for statistical purposes. Additionally RADIUS is widely used by VoIP service providers. It is used to pass login credentials of a SIP end point (like a broadband phone) to a SIP Registrar using digest authentication, and then to RADIUS server using RADIUS.

Another embodiment of the present invention is adapted for a power socket running a Windows 2003 system. Normally, the load utilizing that socket is controlled by an Active Directory Secured Microsoft Windows Server. An Active Directory Secured Microsoft Windows Server is an implementation of LDAP directory services by Microsoft for use in Windows environments. An Active Directory Secured Microsoft Windows Server allows administrators to assign enterprise-wide policies, deploy programs to many computers, and apply critical updates to an entire organization. An Active Directory Secured Microsoft Windows Server stores information and settings relating to an organization in a central, organized, accessible database. An Active Directory Secured Microsoft Windows Server networks can vary from a small installation with a few hundred objects, to a large installation with millions of objects. In this embodiment of the present invention, the Active Directory Secured Microsoft Windows Server may be used to control and manage the power to the load.

Another typical security service that allows the consumer to control the power sockets is Kerberos, which is freely available from the Massachusetts Institute of Technology. Kerberos is a computer network authentication protocol, which allows individuals communicating over an insecure network to prove their identity to one another in a secure manner. Kerberos prevents eavesdropping or replay attacks, and ensures the integrity of the transmitted data. It provides mutual authentication—both the user and the server verify each other's identity. Kerberos builds on symmetric key cryptography and uses, as its basis, the Needham-Schroeder protocol. It makes use of a trusted third party, termed a Key Distribution Center (KDC), which consists of two logically separate parts: an Authentication Server (AS) and a Ticket Granting Server (TGS). Kerberos works on the basis of "tickets" which serve to prove the identity of users. Kerberos maintains a database of secret keys; each entity on the network—whether a client or a server—shares a secret key known only to itself and to Kerberos. Knowledge of this key serves to prove an entity's identity. For communication between two entities, Kerberos generates a session key, which they can use to secure their interactions. In this embodiment of the invention the user access and control are managed by the Kerberos systems.

Figure 4:
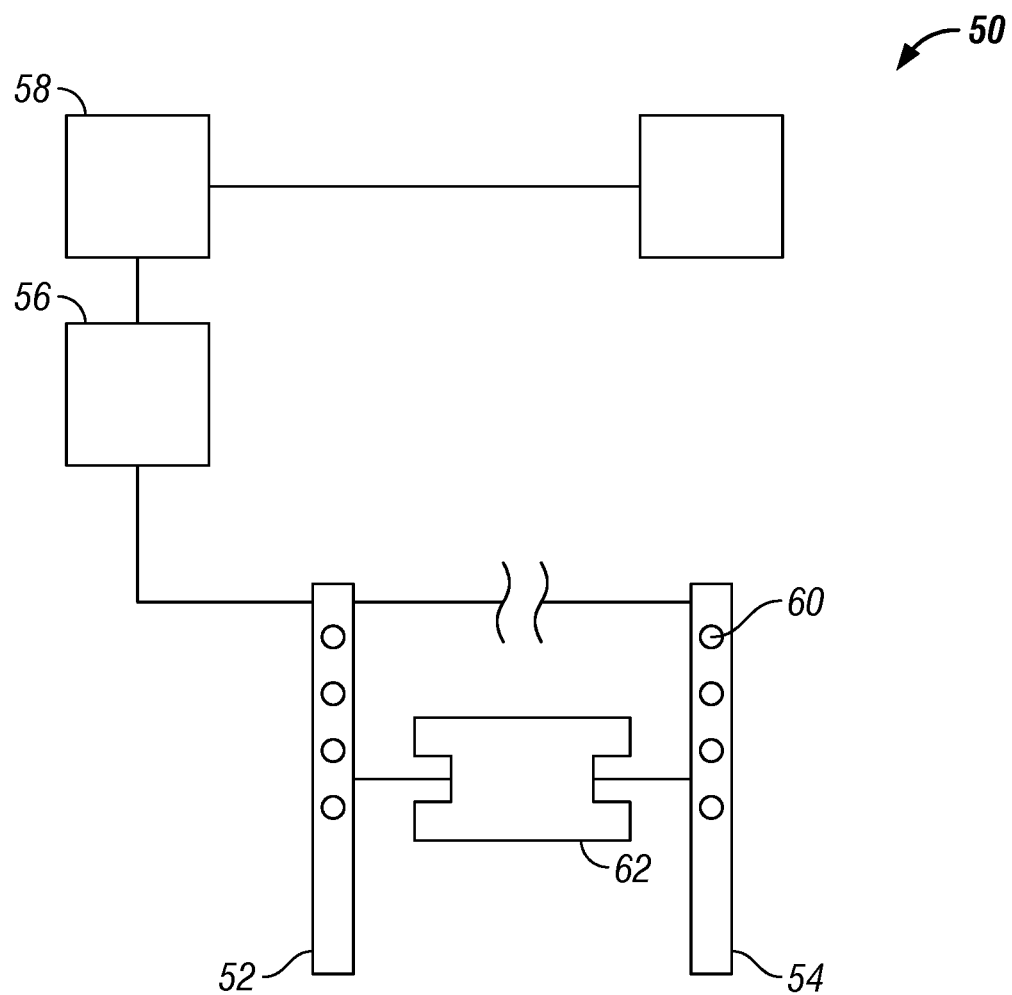
FIG. 4 illustrates an embodiment of the present invention with a mid-level asset manager.

Further, the present invention allows control of the adaptive power strips through a web based interaction, such as an HTTPS or HTTP interface, which can also provide security. One aspect of this invention is to connect the plurality of adaptive power strips to a mid level asset manager as shown in FIG. 4. Data center 50 comprises one or more power strips 52 and 54. Each power strip is given an individual IP Address and is connected a mid-level manager 56. The mid-level manager is in turn connected to a communications protocol 58, such as the Internet, a Web, SNMP, or a local network. Each power strip comprises multiple power sockets 60. The data center further comprises a server 62, such as, but not limited to, an e-mail server.

The midlevel manager may consist of a serial interface card and a web card. The web card can provide web-management capability for enhanced communications and control. The mid-level manager allows the system of adaptive power strips to be operated over the network using a web browser running on a computer. The web interface can be used by a client computer running any modern operating system (e.g. Windows, Mac OS X, Linux, etc) since web browser programs are available for all of them.

Figure 3:
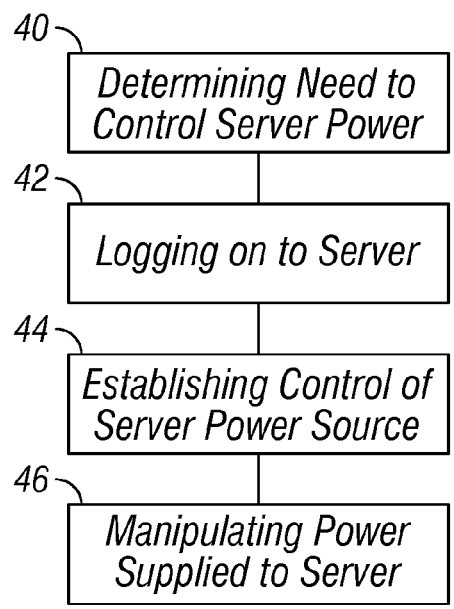
FIG. 3 illustrates a flow chart embodying the present invention.

FIG. 3 illustrates an embodiment of a method utilizing the current invention. At step 40 an administrator of an email server desires to control the power output of the email server. At step 42, the administrator logs into the email server through a typical security protocol, such as Active Directory, RADIUS, or Kerberos. At step 44, the administrator gains control over the email server. He is also given access to control the power socket to that server. The interface with the power control only shows the strips and the sockets associated with his email server. At step 46, the administrator performs a reboot, such as by momentarily interrupting power to the email server, or other necessary power control and monitoring.

Another advantage of the current invention is that systems utilizing this invention will not require personnel at the data center to be directly involved in the day to day operation of the power sockets running a piece of equipment. The security for controlling the power strip socket is kept up-to-date with the security access for the server or item managed. For example, if a user loses their access rights to a server, their access rights to control the power to the server are automatically removed also and kept synchronized with the power strips.

Figure 5:
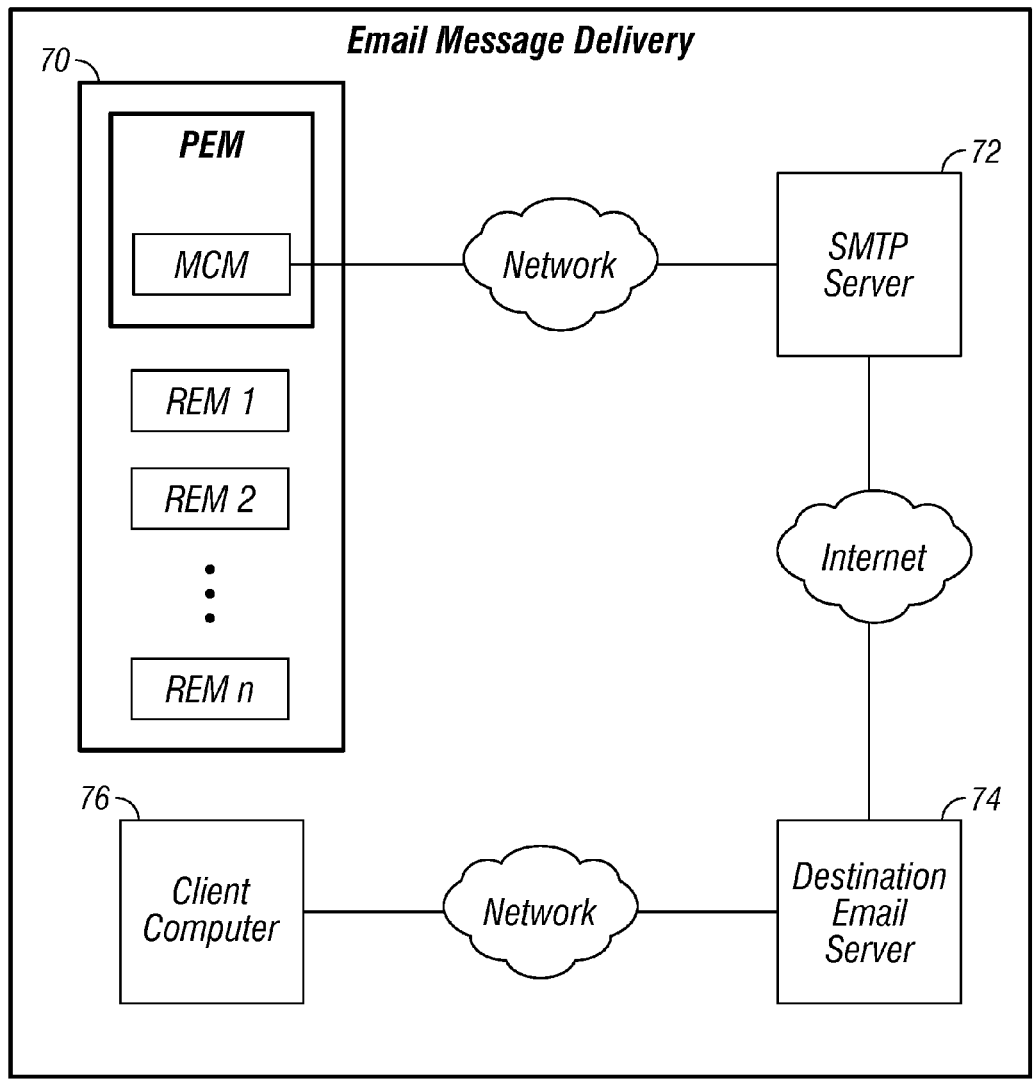
FIG. 5 illustrates a method of sending email alerts to a client from the system.

A further embodiment of the current invention is a system that is able to notify the user of events, errors, and warnings via short message service (SMS) or email. FIG. 5 is a block diagram that shows how an email message is sent to a recipient in a preferred embodiment. The following steps are taken to deliver an email message. First, the email is sent by the adaptable power strip 70 to the configured SMTP server 72. The SMTP server 72 delivers the email to the email server 74 specified in the email address. The email is delivered to an email account specified in the email address. The client computer 76 retrieves the email message from the mail server. POP3, Microsoft Exchange, and web interfaces are examples of how a client may retrieve an email message from the destination email server.

Figure 6:
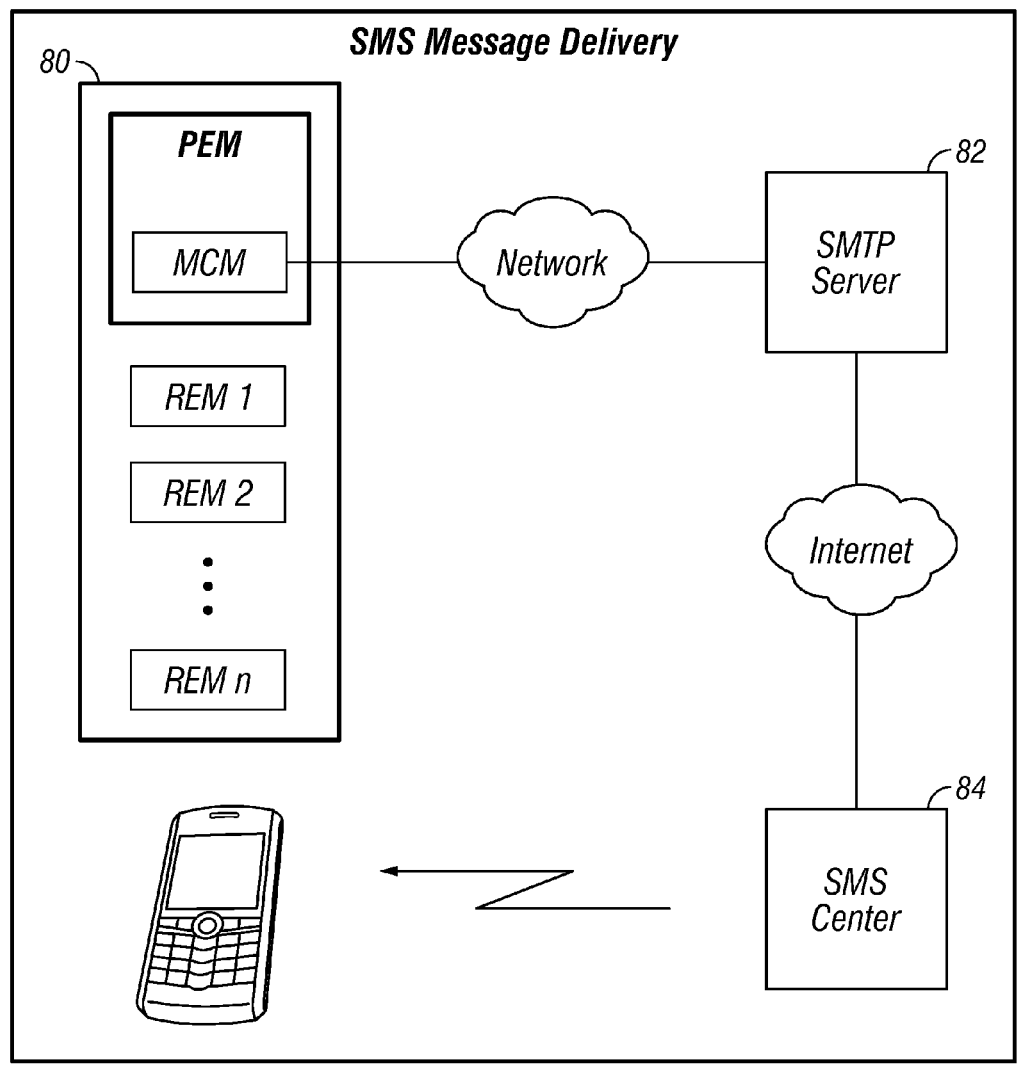
FIG. 6 illustrates a method of sending SMS messages to a client from the system.

FIG. 6 illustrates a block diagram that shows how a SMS message is sent to a mobile device. From the point of view of the adaptable power strip 80, a SMS message is initiated by sending an email message to one or more configured email addresses. The following steps are taken to deliver a SMS message. First, the SMS email is sent by the adaptable power strip 80 to the configured SMTP server 82. The SMTP server 82 delivers the SMS email to the specified email address. This SMS email is delivered to an email account monitored by a SMS Center 84. The SMS Center 84 delivers the SMS message to the mobile device specified in the "to" address of the SMS email. Some routing of SMS messages may occur after being received by the SMS Center, however it is not shown in the diagram.

Other and further embodiments utilizing one or more aspects of the inventions described above can be devised without departing from the spirit of Applicant's invention. Further, the various methods and embodiments of the invention can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A method of managing power to a remote device comprising:
   connecting the remote device to an IP configurable power strip having multiple power sockets, the remote device receiving power through a specific one of the power sockets, the remote device and the IP configurable power strip each adapted to require authentication by a user;
   connecting each of the IP configurable power strip and the remote device to a network, the IP configurable power strip having an IP address assigned thereto;
   determining whether the user has been successfully authenticated on the remote device in accordance with a predefined security protocol, the IP configurable power strip configured to permit the user control of the specific one of the power sockets over the network without authentication by the user on the IP configurable power strip if the user has been successfully authenticated on the remote device;
   accessing the IP configurable power strip over the network using the IP address assigned thereto; and
   manipulating the power supplied to the remote device by controlling the specific one of the power sockets on the IP configurable power strip over the network.

2. The method of claim 1, wherein the remote device is a server.

3. The method of claim 2, wherein the server is a computer server or web hosting server.

4. The method of claim 1, further wherein manipulating the power comprises turning off, on, and off then on the power supplied to the remote device.

5. The method of claim 1, wherein the security protocol is Kerberos.

6. The method of claim 1, wherein the security protocol is Active Desktop.

7. The method of claim 1, wherein the security protocol is an external security protocol such as RADIUS.

8. The method of claim 1, further comprising accessing the specific power socket assigned to the device.

9. The method of claim 8, wherein manipulating the power comprises turning off, on, and off then on the power supplied to the device.

10. A user managed power system comprising:
    an interface configured for data communication with a powered user device at a first location, the interface residing at a second location remote from the first location and connected to the powered user device at the first location;
    a power distribution device at the first location having a plurality of power sockets and supplying power to the powered user device through a specific one of the power sockets, the power distribution device in data communication with the interface, the powered user device and the power distribution device each adapted to require authentication by a user; and
    wherein, upon successful authentication of the user on the powered user device in accordance with a security protocol, a command entered at the interface causes manipulation of the power supplied to the powered user device through the specific one of the power sockets without authentication by the user on the power distribution device.

11. The user managed power system of claim 10, wherein the user device is a server.

12. The user managed power system of claim 10, wherein the security protocol is Kerberos.

13. The user managed power system of claim 10, wherein the security protocol is Active Desktop.

14. The user managed power system of claim 10, wherein the security protocol is an external security protocol, such as RADIUS.

15. A user managed power system comprising:
    one or more AC power supplies configured to be connected to a powered user device at a first location, each AC power supply having multiple power sockets thereon, the one or more AC power supplies providing power to the powered user device through a specific power socket thereof, the powered user device and the one or more AC power supplies each requiring authentication by a user; and
    a network interface residing in each AC power supply, the network interface configured to connect each AC power supply to an authentication server at a second location using a communications protocol, the authentication server configured to authenticate the user on the powered user device;
    wherein each AC power supply is further configured to allow the power provided to the powered user device through the specific power socket thereof to be manipulated by the user without authentication by the user on the AC power supply upon successful authentication of the user on the powered user device.

16. The user managed power system of claim 15, further comprising a mid-level manager connected to the one or more AC power supplies.

17. The user managed power system of claim 16, wherein the one or more AC power supplies is adapted to be controlled remotely by a user through the mid-level manager.

18. The user managed power system of claim 17 wherein the user controls the one or more AC power supplies through a web based interface.

19. The user managed power system of claim 18 wherein the web based interface contains security protocols.

20. The user managed power system of claim 15, wherein the one or more AC power supplies are power strips.

* * * * *